Figure 1:
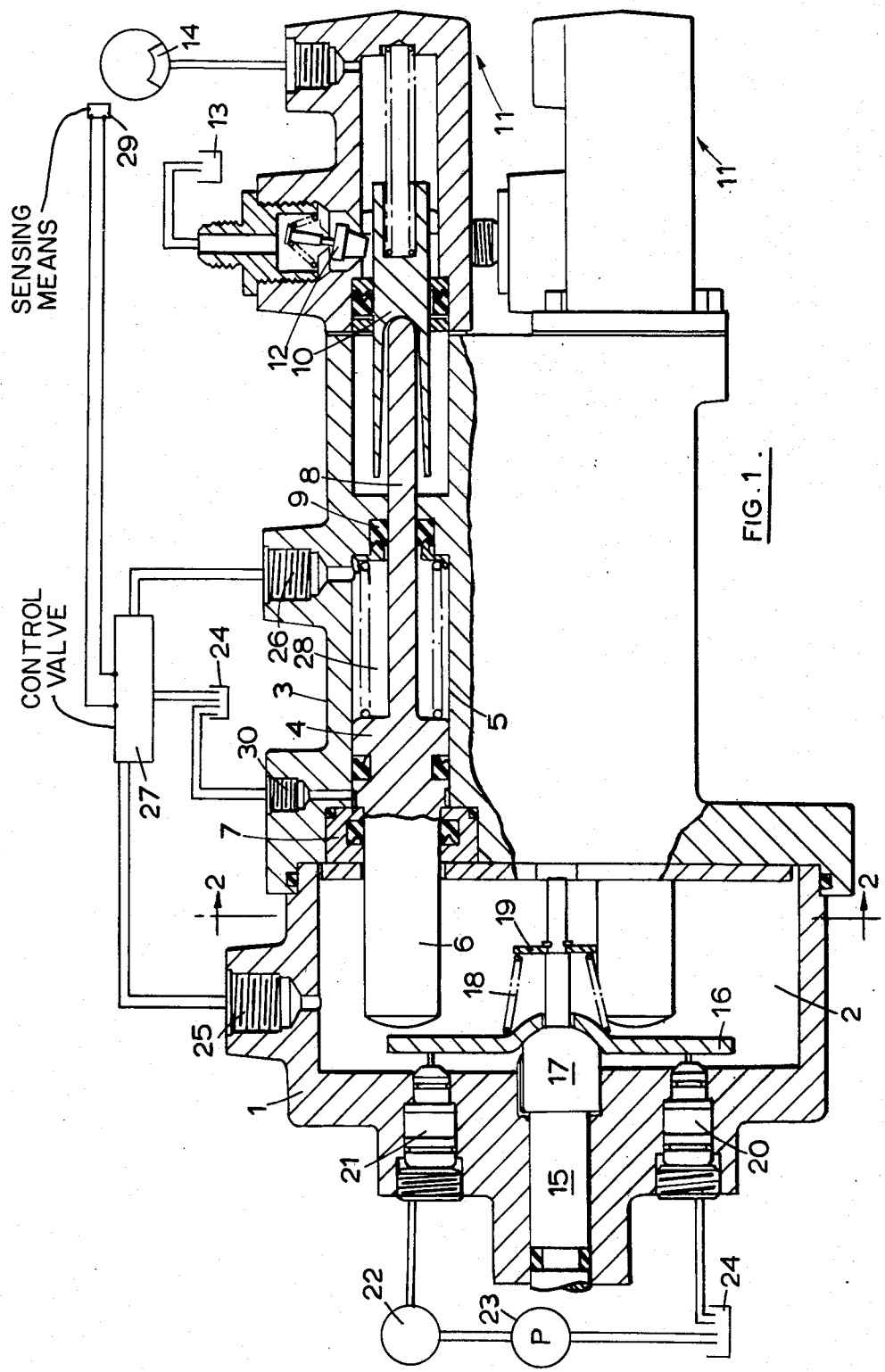

United States Patent [19]

Harries

[11] 3,922,023
[45] Nov. 25, 1975

[54] VEHICLE HYDRAULIC BRAKING SYSTEM WITH INDEPENDENT BRAKE CIRCUITS
[75] Inventor: David Anthony Harries, Shirley, England
[73] Assignee: Girling Limited, Birmingham, England
[22] Filed: Mar. 28, 1974
[21] Appl. No.: 455,746

[30] Foreign Application Priority Data
Mar. 29, 1973 United Kingdom............... 15029/73

[52] U.S. Cl................ 303/21 F; 188/345; 303/6 R; 303/21 AF
[51] Int. Cl.²...................... B60T 8/06; B60T 13/00
[58] Field of Search.......... 303/21 F, 21 AF, 61–63, 303/68–69, 6 C, 6 R, 54, 52, 50; 188/345, 181 A, 181 R, 355, 358, 359

[56] References Cited
UNITED STATES PATENTS

| | | | |
|---|---|---|---|
| 2,815,502 | 12/1957 | Zeller | 188/345 X |
| 3,060,691 | 10/1962 | Davis | 188/345 X |
| 3,142,965 | 8/1964 | Hazelbaker | 188/345 X |
| 3,227,494 | 1/1966 | Alfieri | 303/54 X |
| 3,401,982 | 9/1968 | Walker et al. | 303/21 F |
| 3,524,683 | 8/1970 | Stelzer | 303/6 R X |
| 3,603,649 | 9/1971 | Wilson | 303/21 F |
| 3,608,979 | 9/1971 | Coyle | 188/181 A UX |
| 3,640,067 | 2/1972 | Ingram | 188/345 X |
| 3,729,235 | 4/1973 | Bach et al. | 303/21 F |

*Primary Examiner*—Trygve M. Blix
*Assistant Examiner*—Douglas C. Butler
*Attorney, Agent, or Firm*—Scrivener Parker Scrivener and Clarke

[57] ABSTRACT

A braking system includes a booster operated master cylinder assembly having three angularly spaced, parallel master cylinders each connected into an independent brake circuit. A pedal-operated member is arranged to apply all the master cylinders in the event of a failure of the booster fluid.

6 Claims, 3 Drawing Figures

VEHICLE HYDRAULIC BRAKING SYSTEM WITH INDEPENDENT BRAKE CIRCUITS

This invention relates to hydraulic braking systems for vehicles of the kind in which a master cylinder for supplying hydraulic fluid to a brake circuit is at least partially operated by fluid from a high pressure source under the control of manually actuated valve means.

Problems arise in extending such a braking system to a system which has a plurality of separate brake circuits.

According to the present invention in a braking system of the kind set forth a master cylinder assembly comprises a housing including a plurality of master cylinders each being connected in at least one independent brake circuit, and the manually operated valve means is arranged to supply fluid to all the master cylinders so that a failure in one brake circuit does not affect the operation of the remaining master cylinders.

The master cylinders may be angularly spaced and in parallel and preferably there are three arranged with their axes on a circle. The master cylinders may be operated entirely by fluid under pressure in which case means may be provided for manual operation in the event of a failure of the high pressure source. The manual operating means may be arranged to compensate for pressure differences in the different brake circuits. For example, the master cylinders may all be applied by a plate on a central pedal rod, the plate being able to tilt on the rod to accommodate different degrees of movement of the separate master cylinder pistons.

Alternatively the master cylinders may be manually operated with assistance from the high pressure fluid.

A braking system according to this invention may also include means for modulating the pressure in one or more of the brake circuits in the event of skid. Part of the modulating means may be incorporated in the master cylinder assembly to relieve the force applied by the pressure fluid to one or more of the master cylinders.

Preferably a braking system according to this invention includes three independent brake circuits, one serving a brake on each of the rear wheels of the vehicle, another serving a front wheel brake, and the third serving the other front wheel brake.

The advantage of this system is that a single seal failure will result in the loss of braking on only one front wheel or, at the worst, the loss of braking on both rear wheels, i.e. there will always be braking on at least one front wheel, and this is achieved with a single brake actuator on each wheel.

It might be thought that the loss of braking on one front wheel could lead to out of balance forces acting on the vehicle steering. This is true for vehicles with positive ground offset steering, i.e. when the swivel axis of the steering meets the central plane of the wheel below the ground. However in recent suspension and steering design the tendency has been to reduce ground offset and even to make it negative when out of balance forces on the steering tend to be self correcting.

Figure 2:
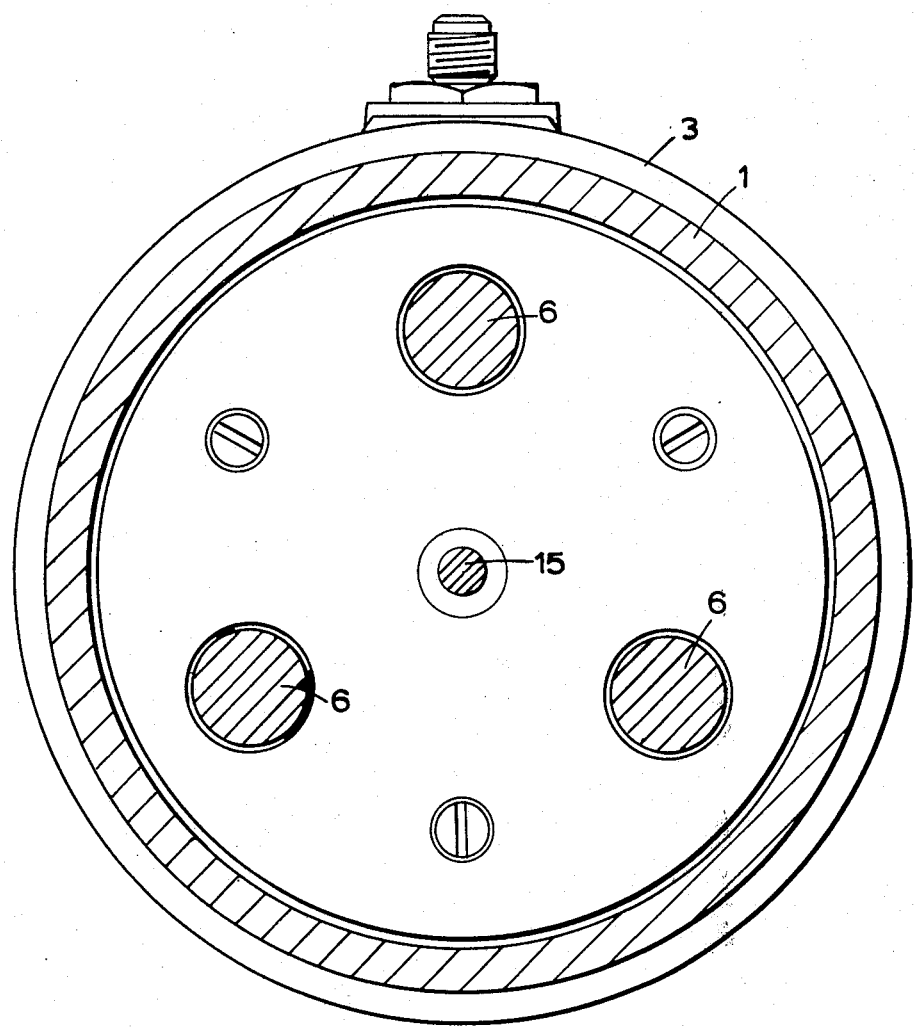
Figure 3:
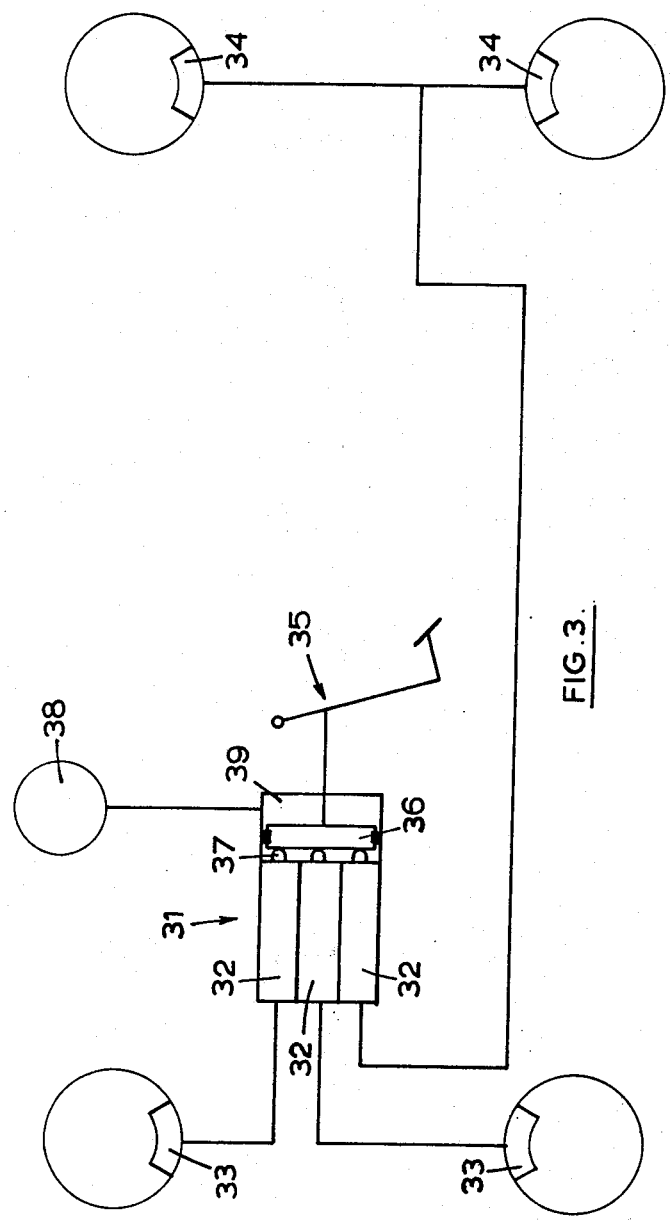

Examples of braking systems according to this invention are illustrated in the accompanying drawings, in which FIG. 1 is a partial longitudinal section through a master cylinder assembly showing its connections in the system, FIG. 2 is a section on the line 2—2 of FIG. 1, and FIG. 3 is a sketch of a modified master cylinder assembly in a braking system.

In FIGS. 1 and 2 a master cylinder assembly comprises housing part 1 which defines a power chamber 2 with a cylinder block 3 in which three modulator pistons 4 work in three angularly spaced bores 5. A reduced diameter extension 6 extends rearwardly from each piston 4 through a seal assembly 7 into the power chamber 2. A further reduced diameter extension 8 extends forwardly from piston 4 through a seal 9 to engage a piston 10 of a master cylinder 11 bolted to the cylinder block. The master cylinder piston 10 operates a tilting valve 12 controlling a connection to a reservoir 13 and is adapted to supply fluid under pressure to a wheel brake 14.

A pedal operated rod 15 extends axially into the power chamber 2 and carries a circular plate 16 rockingly mounted on a domed shoulder 17 on the rod by means of a spring 18 acting between the plate and a retainer 19. When the rod 15 is in its normal retracted position plate 16 holds a reservoir valve 20 open and an inlet valve 21 closed. The inlet valve 21 controls a connection to an hydraulic accumulator 22 which is charged by a pump 23 drawing from a reservoir 24 connected to reservoir valve 20. On forward movement of the rod the reservoir valve closes and the outlet valve opens.

An outlet port 25 in housing part 1 allows the power chamber 2 to be connected to a control port 26 in the cylinder block through a normally closed solenoid control valve 27. The control port 26 leads into a control space 28 ahead of the modulator piston 4 and is normally connected to reservoir 24 through the control valve 27 which is actuated by means 29 sensitive to the deceleration of the wheel braked by brake 14. A bleed port 30 connects the space between seal 7 and the seal on piston 4 to reservoir.

When the brake pedal is depressed, rod 15 and the plate 16 advance to close the reservoir valve 20 and open the inlet valve 21 to allow high pressure fluid from accumulator 22 into the power chamber two. Pressure fluid acting on the extensions 6 from modulator pistons 4 advances the modulator pistons which in turn advance the three master cylinder pistons 10 to apply the wheel brakes 14. It will be apparent that a failure in one or two of the brake circuits will not affect the operation of the remaining master cylinder or cylinders since the power chamber is common to all the master cylinders.

If there should be a failure in the fluid supply, further forward movement of rod 15 will bring plate 16 into engagement with the piston extensions 6. Plate 16 is able to tilt on the domed shoulder 17 to compensate for any variation in the distances travelled by the master cylinder pistons to apply the brakes.

In the event of skid a signal from the sensing means 29 will activate the control valve 27 to close the connection between the control space 28 and reservoir and allow high pressure fluid from the power chamber to enter the control space. This will equalise the pressure across modulator piston 4 and if the area of the piston in the control space is larger than the area of the extension 6, there will be a net force acting to retract the piston and relieve the brake pressure. If a separate control valve and sensing means are provided for each brake circuit, the braking pressure in each circuit can be modulated independently of the other circuits.

In the braking system shown diagrammatically in FIG. 3, a master cylinder assembly 31 including three master cylinders 32 supplies three independent brake circuits. A separate master cylinder is connected to each of the front wheel brakes 33 and the third master cylinder is connected to both the rear wheel brakes 34. The master cylinder assembly of FIGS. 1 and 2 could be included in the same kind of system.

The master cylinder assembly 31 is operated by a pedal 35 which applies a piston 36 which in turn acts on extensions 37 of all the master cylinder pistons. Forward movement of pedal 35 actuates valve means (not shown) to allow fluid from a high pressure source 38 to enter a power chamber 39 behind piston 36. The valve means could be similar to valves 20 and 21 or any equivalent arrangement. In this embodiment of the assembly the pressure fluid is only assisting the effort applied by the pedal so that in the event of a pressure failure pedal operation will continue without power assistance.

Anti-skid means could be included in the master cylinder assembly as in FIG. 1. Alternatively separate pressure modulators could be included in each or all of the brake circuits between the master cylinder assembly and the brakes.

I claim:

1. An hydraulic braking system for vehicles comprising a plurality of independent brake circuits; a master cylinder assembly including a housing having a plurality of bores, a plurality of master cylinders arranged in said housing corresponding in number to said master cylinders and each master cylinder is connected in at least one of said circuits, and booster means in said housing for at least partially operating all of said master cylinders by fluid pressure, said booster means being arranged so that a failure in one brake circuit does not affect the operation of the remaining master cylinders; a source of hydraulic fluid under pressure; and manually operated valve means for controlling the supply of fluid from said source to said booster means, said booster means comprising a booster chamber in said housing, and a plurality of modulator pistons working in said bores to operate said master cylinders, being movable between retracted and advanced positions, each modulator piston being of stepped outline and having a first end exposed to said booster chamber, a second opposite end of an area less than that of said first end and acting to operate a corresponding one of said master cylinders, and an intermediate portion of an area greater than that of said first end and providing a reaction face of an effective area greater than that of said first end and exposed to a portion of said bore on the side of said intermediate portion remote from said first end which defines a control space, a plurality of control valves each providing communication between said booster chamber and a corresponding one of said control spaces and movable between a closed position and an open position, and a plurality of anti-skid sensing means each responsive to deceleration of a braked wheel in one of said brake circuits to control operation of the one said control valve which controls communication between said booster chamber and said control space for the master cylinder which control the said one of said brake circuits, each anti-skid sensing means being operative when the deceleration of the corresponding braked wheel exceeds a predetermined value to open the said control valve controlled thereby and connect said control space to said booster chamber whereby equal fluid pressure acting over different areas of said modulator piston apply thereto a resultant force to urge said modulator piston into said retracted position to relieve the braking effect of said braked wheel independently of operation of the other of said master cylinders.

2. A braking system as in claim 1 wherein said master cylinders are angularly spaced and in parallel.

3. A braking system as in claim 2 wherein three master cylinders are arranged in said housing with their axes on a circle.

4. A braking system as in claim 2 wherein manual operating means are provided to operate said master cylinders in the event of failure of said high pressure source.

5. A braking system as in claim 4 wherein said manual operating means comprises a plate mounted for tilting movement on a pedal-operated rod located centrally with respect to said master cylinders.

6. A braking system as in claim 1 including three independent brake circuits, one serving a brake on each of the rear wheels of the vehicle, another serving a front wheel brake, and the third serving the other front wheel brake.

* * * * *